US011668323B2

(12) United States Patent
Fedorikhin et al.

(10) Patent No.: US 11,668,323 B2
(45) Date of Patent: Jun. 6, 2023

(54) COOLANT SYSTEM FOR INTEGRATED E-MACHINE CONTROLLER FOR TURBOMACHINE

(71) Applicant: Garrett Transportation I Inc., Torrance, CA (US)

(72) Inventors: Valeriy Fedorikhin, Redondo Beach, CA (US); Andrew Love, Marina Del Rey, CA (US); Ali Mohammadpour, Redondo Beach, CA (US)

(73) Assignee: GARRETT TRANSPORTATION I INC., Torrance, CA (US)

(*) Notice: Subject to any disclaimer, the term of this patent is extended or adjusted under 35 U.S.C. 154(b) by 19 days.

(21) Appl. No.: 17/304,874

(22) Filed: Jun. 28, 2021

(65) Prior Publication Data
US 2022/0412373 A1  Dec. 29, 2022

(51) Int. Cl.
*F04D 29/58* (2006.01)
*F02B 33/40* (2006.01)
*F04D 25/06* (2006.01)

(52) U.S. Cl.
CPC .......... *F04D 29/5813* (2013.01); *F02B 33/40* (2013.01); *F04D 25/06* (2013.01); *F05D 2220/40* (2013.01); *F05D 2260/213* (2013.01)

(58) Field of Classification Search
CPC ....... F04D 29/5813; F04D 25/06; F02B 33/40
USPC ...................................................... 417/423.8
See application file for complete search history.

(56) References Cited

U.S. PATENT DOCUMENTS

| 4,908,757 | A | * | 3/1990 | Jensen | H02K 9/223 361/699 |
| 5,491,370 | A | * | 2/1996 | Schneider | H02K 11/33 310/68 R |
| 6,141,219 | A | * | 10/2000 | Downing | H01L 23/473 361/689 |
| 6,198,183 | B1 | * | 3/2001 | Baeumel | H02K 5/203 310/52 |
| 6,639,798 | B1 | * | 10/2003 | Jeter | H05K 7/20927 174/15.1 |
| 6,930,417 | B2 | * | 8/2005 | Kaneko | H02K 11/33 310/58 |

(Continued)

FOREIGN PATENT DOCUMENTS

DE   112016003006 T5   3/2018
EP   1260714 A1   11/2002
(Continued)

*Primary Examiner* — J. Todd Newton
(74) *Attorney, Agent, or Firm* — Lorenz & Kopf, LLP

(57) ABSTRACT

A fluid compressor device includes a housing and a rotating group supported for rotation within the housing about an axis. The device also includes a compressor stage including a compressor wheel of the rotating group that is supported on a shaft of the rotating group. The device also includes an e-machine stage including an e-machine that is operably coupled to the shaft and that is configured to operate as at least one of a motor and a generator. Additionally, the device includes an integrated controller that extends at least partly over the e-machine stage in a circumferential direction about the axis. The integrated controller includes a coolant core that receives a flow of a coolant therethrough for cooling the integrated controller. The coolant core extends over the e-machine stage in a circumferential direction about the axis.

19 Claims, 4 Drawing Sheets

(56) References Cited

U.S. PATENT DOCUMENTS

| | | | | |
|---|---|---|---|---|
| 7,102,260 | B2* | 9/2006 | Takenaka | H02K 11/33 |
| | | | | 310/52 |
| 7,352,077 | B2 | 4/2008 | Shibui et al. | |
| 10,462,937 | B1 | 10/2019 | Louco et al. | |
| 10,700,571 | B2* | 6/2020 | Zhou | H02K 5/203 |
| 11,125,108 | B2* | 9/2021 | Garrard | F01D 25/16 |
| 2010/0284824 | A1* | 11/2010 | Hippen | F02C 6/12 |
| | | | | 415/110 |
| 2012/0236498 | A1* | 9/2012 | Pal | H05K 7/20163 |
| | | | | 361/695 |
| 2018/0191220 | A1 | 7/2018 | Kato et al. | |
| 2019/0181717 | A1 | 6/2019 | Zhou et al. | |

FOREIGN PATENT DOCUMENTS

| | | |
|---|---|---|
| EP | 2305981 B1 | 4/2013 |
| EP | 3244033 A1 | 11/2017 |

\* cited by examiner

COOLANT SYSTEM FOR INTEGRATED E-MACHINE CONTROLLER FOR TURBOMACHINE

TECHNICAL FIELD

The present disclosure generally relates to a turbomachine and, more particularly, relates to a coolant system for an integrated e-machine controller for a turbomachine.

BACKGROUND

Some turbomachines include an e-machine, such as an electric motor or generator. More specifically, some turbochargers, superchargers, or other fluid compression devices can include an electric motor that is operably coupled to the same shaft that supports a compressor wheel, turbine wheel, etc. The electric motor may drivingly rotate the shaft, for example, to assist a turbine stage of the device. In some embodiments, the e-machine may be configured as an electric generator, which converts mechanical energy of the rotating shaft into electric energy.

These devices may also include a controller that, for example, controls operation of the e-machine. More specifically, the control system may control the torque, speed, or other operating parameters of the e-machine and, as such, control operating parameters of the rotating group of the turbomachine.

However, conventional controllers of such fluid compression devices suffer from various deficiencies. These controllers can be heavy and/or bulky. Furthermore, the electronics included in the controller may generate significant heat, which can negatively affect operations. Similarly, the operating environment of the device can subject the electronics to high temperatures, vibrational loads, or other conditions that negatively affect operations. In addition, manufacture and assembly of conventional control systems can be difficult, time consuming, or otherwise inefficient.

Thus, it is desirable to provide an e-machine controller for a fluid compression device that is compact, that operates at high efficiency, and that provides a highly effective cooling effect. It is also desirable to provide improvements that increase manufacturing efficiency for such a controller. Other desirable features and characteristics of the present disclosure will become apparent from the subsequent detailed description and the appended claims, taken in conjunction with the accompanying drawings and this background discussion.

BRIEF SUMMARY

In one embodiment, a fluid compressor device is disclosed that includes a housing and a rotating group supported for rotation within the housing about an axis. The fluid compressor device also includes a compressor stage including a compressor wheel of the rotating group that is supported on a shaft of the rotating group. The device also includes an e-machine stage including an e-machine that is operably coupled to the shaft and that is configured to operate as at least one of a motor and a generator. Additionally, the compressor device includes an integrated controller that extends at least partly over the e-machine stage in a circumferential direction about the axis. The integrated controller includes a coolant core that receives a flow of a coolant therethrough for cooling the integrated controller. The coolant core extends at least partly over the e-machine stage in a circumferential direction about the axis.

In another embodiment, a method of manufacturing a fluid compressor device is disclosed. The method includes supporting a rotating group for rotation within a housing about an axis. The rotating group includes a compressor wheel that is supported on a shaft. Furthermore, the method includes operably coupling an e-machine of an e-machine stage to the shaft. The e-machine is configured to operate as at least one of a motor and a generator. The method further includes connecting an integrated controller to the e-machine. The integrated controller extends at least partly over the e-machine stage in a circumferential direction about the axis. The integrated controller includes a coolant core configured to receive a flow of a coolant therethrough for cooling the integrated controller. The coolant core extends at least partly over the e-machine in a circumferential direction about the axis.

Moreover, a turbocharger is disclosed. The turbocharger includes a housing and a rotating group supported for rotation within the housing about an axis. The turbocharger also includes a compressor stage including a compressor wheel of the rotating group that is supported on a shaft of the rotating group. The turbocharger additionally includes a turbine stage including a turbine wheel of the rotating group that is supported on the shaft of the rotating group. The turbocharger further includes a motor stage including an electric motor that is operably coupled to the shaft and that is configured to drivingly rotate the rotating group about the axis. Moreover, the turbocharger includes an integrated controller that extends at least partly over the motor stage in a circumferential direction about the axis. The integrated controller includes a coolant core that receives a flow of a coolant therethrough for cooling the integrated controller. The coolant core extends at least partly over the motor stage in a circumferential direction about the axis.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved controller for a turbomachine. The controller may be integrated into, packaged among, and compactly arranged on the turbomachine for improved performance and for reducing the size and profile of the turbomachine. In some embodiments, the integrated controller may wrap, extend, span circumferentially, or otherwise be arranged about an axis of rotation defined by the rotating group of the turbomachine. The housing of the controller may be generally arcuate in some embodiments, and internal components (e.g., support structures, electronics components, and/or coolant system features) may be shaped, configured, assembled, and arranged about the axis to reduce the size of the turbomachine.

In addition, the turbomachine may be a compressor device, and the integrated controller may be arranged proximate the compressor section (e.g., proximate a compressor housing). Furthermore, the turbomachine may include a turbine section, and the compressor device may be disposed proximate thereto (e.g., proximate the turbine housing). The controller may, in some embodiments, be arranged compactly between a compressor section and a turbine section of the turbomachine. Furthermore, in some embodiments, the integrated controller may be wrapped or disposed about an e-machine (e.g., a motor) of the turbomachine. The controller may be configured for controlling the e-machine and their close proximity may increase operating efficiency. The controller may, thus, be closely integrated and packaged within the turbomachine. The components may be securely and robustly supported within the integrated controller.

The integrated controller may also include a number of features for cooling the electronics components of the integrated controller and/or for cooling surrounding components of the turbomachine. For example, the integrated controller may include a coolant core, which receives a flow of coolant for removing heat from the electronics components and/or other components. The coolant core may include one or more mounts, seats, attachment areas, etc. that may be used to support electronics components, and the resulting interface may increase the cooling effect. Thus, the electronics components may be tightly packed, and the turbomachine may operate at extreme conditions, yet the cooling features may maintain temperatures within an acceptable range.

Figure 1:
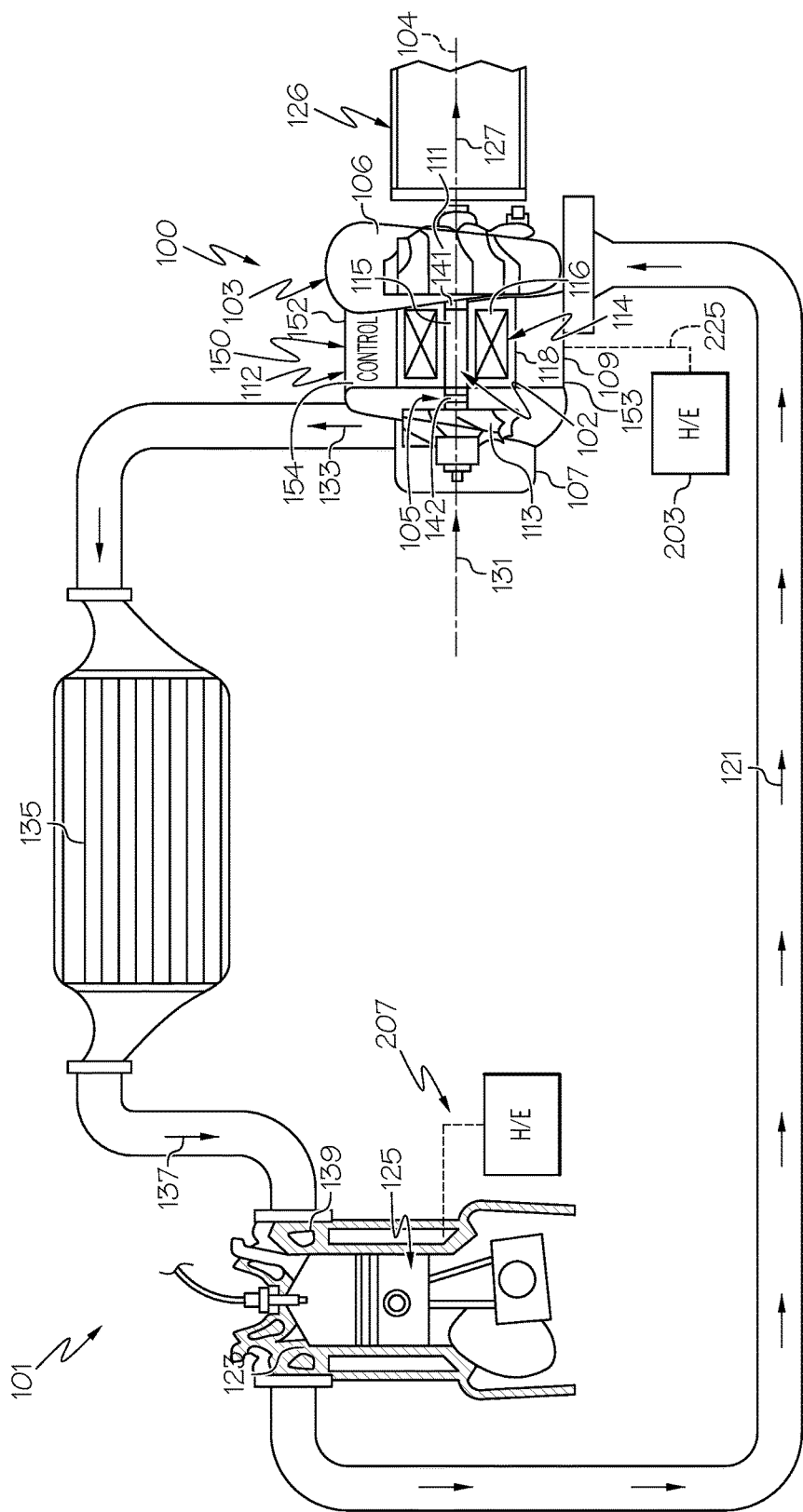
FIG. 1 is a schematic illustration of an engine system with a fluid compressor device that includes an integrated controller according to example embodiments of the present disclosure.

FIG. 1 is a schematic view of an example turbomachine, such as a turbocharger 100 that is incorporated within an engine system 101 and that includes one or more features of the present disclosure. It will be appreciated that the turbocharger 100 could be another turbomachine (e.g., a supercharger, a turbine-less compressor device, etc.) in additional embodiments of the present disclosure. Furthermore, the turbomachine of the present disclosure may be incorporated into a number of systems other than an engine system without departing from the scope of the present disclosure. For example, the turbomachine of the present disclosure may be incorporated within a fuel cell system for compressing air that is fed to a fuel cell stack, or the turbomachine may be incorporated within another system without departing from the scope of the present disclosure.

Generally, the turbocharger 100 may include a housing 103 and a rotating group 102, which is supported within the housing 103 for rotation about an axis 104 by a bearing system 105. The bearing system 105 may be of any suitable type, such as a roller-element bearing or an air bearing system.

As shown in the illustrated embodiment, the housing 103 may include a turbine housing 106, a compressor housing 107, and an intermediate housing 109. The intermediate housing 109 may be disposed axially between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the intermediate housing 109, to connect the turbine wheel 111 to the compressor wheel 113. Accordingly, the turbine wheel 111 and the compressor wheel 113 may rotate together as a unit about the axis 104.

The turbine housing 106 and the turbine wheel 111 cooperate to form a turbine stage (i.e., turbine section) configured to circumferentially receive a high-pressure and high-temperature exhaust gas stream 121 from an engine, specifically, from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 cooperate to form a compressor stage (i.e., compressor section). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor.

Furthermore, the turbocharger 100 may include an e-machine stage 112. The e-machine stage 112 may be cooperatively defined by the intermediate housing 109 and by an e-machine 114 housed therein. The shaft 115 may extend through the e-machine stage 112, and the e-machine 114 may be operably coupled thereto. The e-machine 114 may be an electric motor, an electric generator, or a combination of both. Thus, the e-machine 114 may be configured as a motor to convert electrical energy to mechanical (rotational) energy of the shaft 115 for driving the rotating group 102. Furthermore, the e-machine 114 may be configured as a generator to convert mechanical energy of the shaft 115 to electrical energy that is stored in a battery, etc. As stated, the e-machine 114 may be configured as a combination motor/generator, and the e-machine 114 may be configured to switch functionality between motor and generator modes in some embodiments as well.

For purposes of discussion, the e-machine 114 will be referred to as a motor 116. The motor 116 may include a rotor member (e.g., a plurality of permanent magnets) that are supported on the shaft 115 so as to rotate with the rotating group 102. The motor 116 may also include a stator member (e.g., a plurality of windings, etc.) that is housed and supported within the intermediate housing 109. In some embodiments, the motor 116 may be disposed axially between a first bearing 141 and a second bearing 142 of the bearing system 105. Also, the motor 116 may be housed by a motor housing 118 of the intermediate housing 109. The motor housing 118 may be a thin-walled or shell-like housing that encases the stator member of the motor 116. The motor housing 118 may also encircle the axis 104, and the shaft 115 may extend therethrough.

Furthermore, the turbocharger 100 may include an integrated controller 150. The integrated controller 150 may generally include a controller housing 152 and a number of internal components 154 (e.g., circuitry, electronic components, cooling components, support structures, etc.) housed within the controller housing 152. The integrated controller 150 may control various functions. For example, the integrated controller 150 may control the motor 116 to thereby control certain parameters (torque, angular speed, START/STOP, acceleration, etc.) of the rotating group 102. The integrated controller 150 may also be in communication with a battery, an electrical control unit (ECU), or other components of the respective vehicle in some embodiments. More specifically, the integrated controller 150 may receive DC power from a vehicle battery, and the integrated controller 150 may convert the power to AC power for controlling the motor 116. In additional embodiments wherein the e-machine 114 is a combination motor/generator, the integrated controller 150 may operate to switch the e-machine 114 between its motor and generator functionality.

Figure 3:
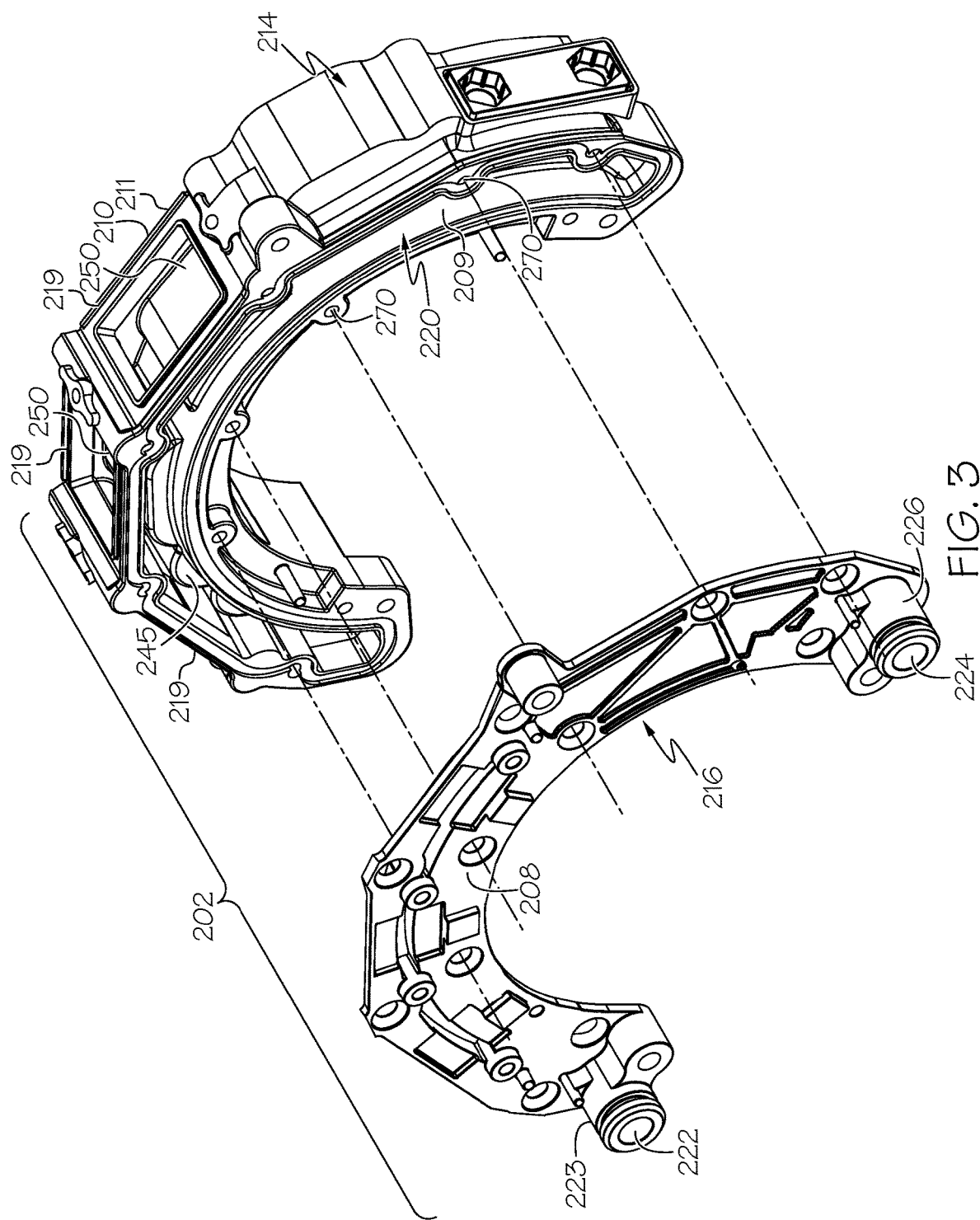
FIG. 3 is an exploded isometric view of a coolant core of the integrated controller of FIG. 2 from a first perspective.
Figure 4:
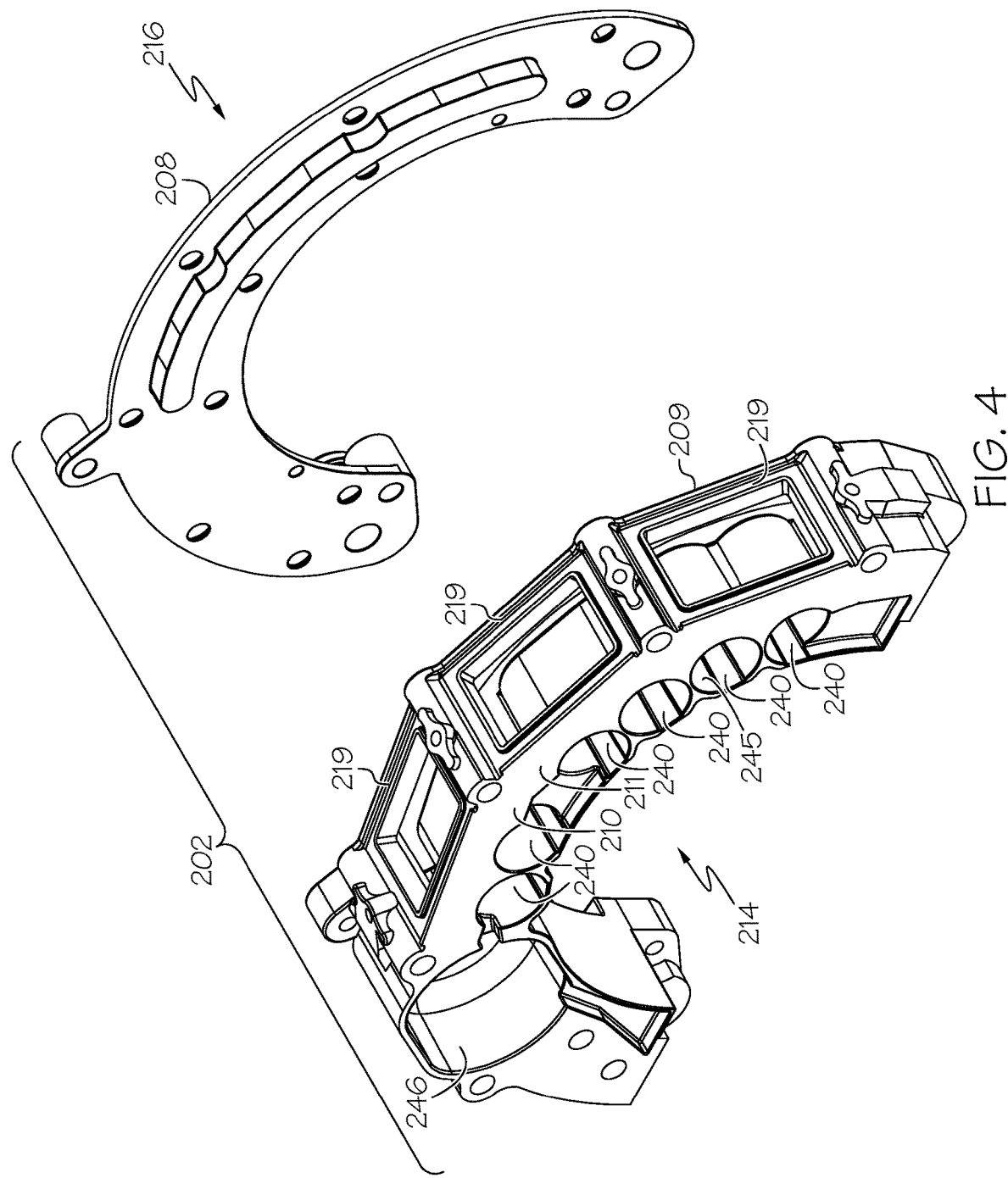
FIG. 4 is an exploded isometric view of a coolant core of the integrated controller of FIG. 2 from a second perspective.

In some embodiments, the integrated controller 150 may be disposed axially between the compressor stage and the turbine stage of the turbocharger 100 with respect to the axis 104. Thus, as illustrated, the integrated controller 150 may be disposed and may be integrated proximate the motor 116. For example, as shown in the illustrated embodiment, the integrated controller 150 may be disposed on and may be arranged radially over the motor housing 118. More specifically, the integrated controller 150 may extend and wrap about the axis 104 to cover over the motor 116 such that the motor 116 is disposed radially between the shaft 115 and the integrated controller 150. The integrated controller 150 may also extend about the axis 104 in the circumferential direction and may cover over, overlap, and wrap over at least part of the motor housing 118. In some embodiments, the integrated controller 150 may wrap between approximately forty-five degrees (45°) and three-hundred-sixty-five degrees (365°) about the axis 104. For example, as shown in FIGS. 2-4, the controller 150 may wrap approximately one-hundred-eighty degrees (180°) about the axis 104.

Figure 2:
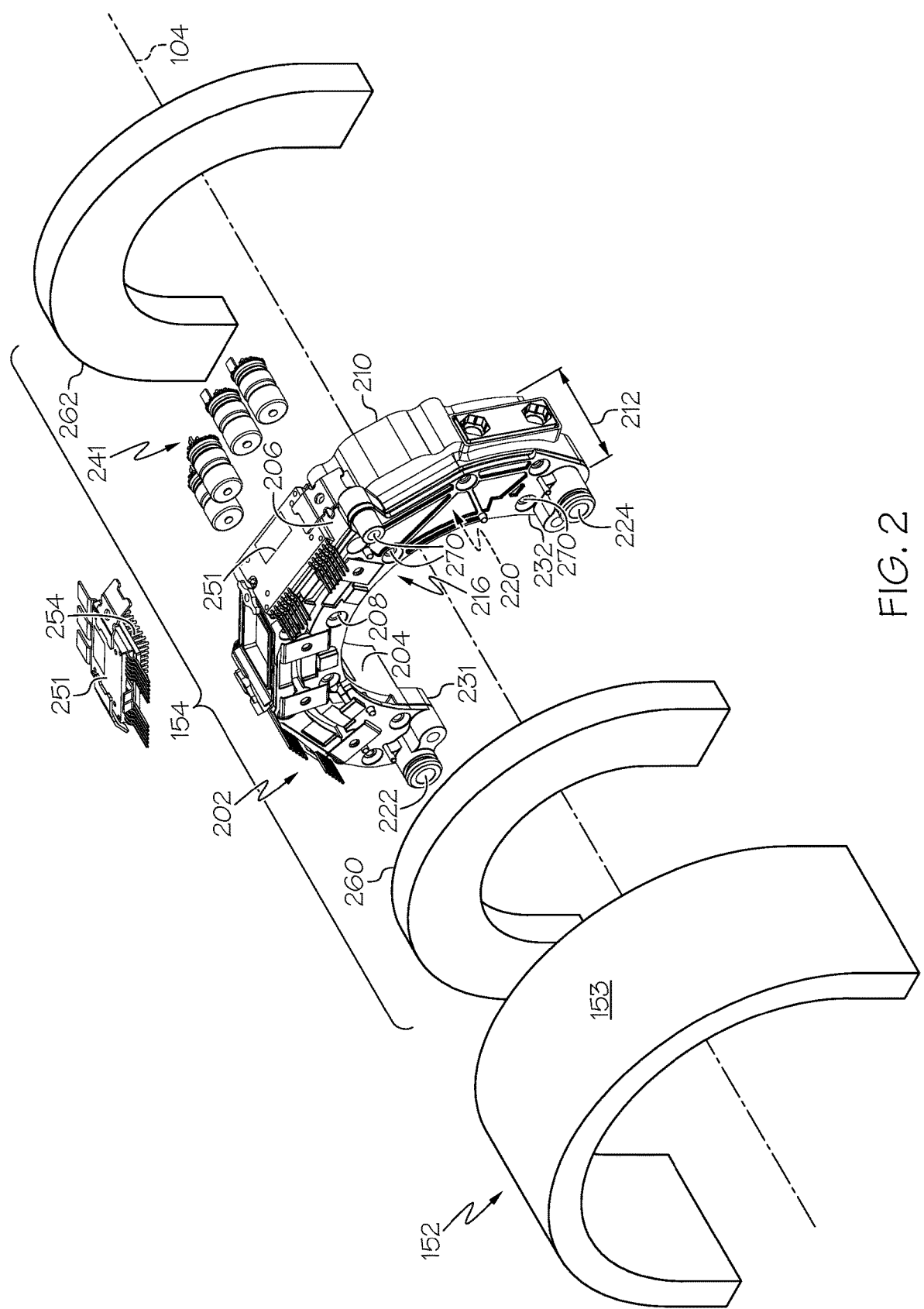
FIG. 2 is an exploded isometric view of the integrated controller according to example embodiments of the present disclosure.

The controller housing 152 is shown schematically in FIG. 2. As illustrated, the housing 152 may generally be arcuate so as to extend about the axis 104 and to conform generally to the rounded profile of the turbocharger 100. The housing 152 may also be an outer shell-like member that is hollow and that encapsulates the internal components 154. Electrical connectors may extend through the housing 152 for electrically connecting the internal components 154. Furthermore, there may be openings for fluid couplings (e.g., couplings for fluid coolant). Additionally, the controller housing 152 may define part of the exterior of the turbocharger 100. An outer surface 153 of the controller housing 152 may extend about the axis 104 and may face radially away from the axis 104. The outer surface 153 may be at least partly smoothly contoured about the axis 102 as shown, or the outer surface 153 may include one or more flat panels that are arranged tangentially with respect to the axis 104 (e.g., a series such flat panels that are arranged about the axis 104). The outer surface 153 may be disposed generally at the same radius as the neighboring compressor housing 107 and/or turbine housing 106 as shown in FIG. 1. Accordingly, the overall size and profile of the turbocharger 100, including the controller 150, may be very compact.

The internal components 154 may be housed within the controller housing 152. Also, at least some of the internal components 154 may extend arcuately, wrap about, and/or may be arranged about the axis 104 as will be discussed. Furthermore, as will be discussed, the internal components 154 may be stacked axially along the axis 104 in close proximity such that the controller 150 is very compact. As such, the integrated controller 150 may be compactly arranged and integrated with the turbine stage, the compressor stage, and/or other components of the turbocharger 100. Also, internal components 154 of the controller 150 may be in close proximity to the motor 116 to provide certain advantages. For example, because of this close proximity, there may be reduced noise, less inductance, etc. for more efficient control of the motor 116.

Furthermore, the controller 150 may include a number of components that provide robust support and that provide efficient cooling. Thus, the turbocharger 100 may operate at extreme conditions due to elevated temperatures, mechanical loads, electrical loads, etc. Regardless, the controller 150 may be tightly integrated into the turbocharger 100 without compromising performance.

Referring now to FIG. 2, the internal components 154 of the integrated controller 150 will be discussed in greater detail according to various embodiments. Generally, the integrated controller 150 may include a coolant core 202. The coolant core 202 is shown in isolation in FIGS. 3 and 4 for clarity. As will be discussed, the coolant core 202 may be configured for supporting a number of electronics components, fastening structures, and other parts of the integrated controller 150. As such the coolant core 202 may be referred to as a "support structure." The coolant core 202 may also define one or more coolant passages through which a fluid coolant flows. As such, the coolant core 202 may receive a flow of a coolant therethrough for cooling the integrated controller 150.

The coolant core 202 may be elongate but curved and arcuate in shape and may extend in a tangential and/or circumferential direction about the axis 104. In other words, the coolant core 202 may wrap at least partially about the axis 104 to fit about the motor 116 of the turbocharger 100. Accordingly, the coolant core 202 may define an inner radial area 204 that faces the axis 104 and an outer radial area 206 that faces away from the axis 104. Moreover, the coolant core 202 may include a first axial end 208 and a second axial end 210, which face away in opposite axial directions. The first axial end 208 may face the compressor section of the turbocharger 100 in some embodiments and the second axial end 210 may face the turbine section in some embodiments. The coolant core 202 may also define an axial width 212, which may be defined parallel to the axis 104 between the first and second axial ends 208, 210. Additionally, the coolant core 202 may be semi-circular and elongate so as to extend circumferentially between a first angular end 231 and a second angular end 232, which are spaced apart angularly about the axis (e.g., approximately one-hundred-eighty degrees (180°) apart).

As shown in FIGS. 3 and 4, the coolant core 202 may be cooperatively defined by a plurality of parts, such as a reservoir body 214 and a cover plate 216. Both the reservoir body 214 and the cover plate 216 may be made from strong and lightweight material with relatively high thermal conductivity characteristics (e.g., a metal, such as aluminum). In some embodiments, the reservoir body 214 and/or the cover plate 216 may be formed via a casting process (e.g., high pressure die casting).

The cover plate 216 may be relatively flat, may be arcuate (e.g., semi-circular), and may lie substantially normal to the axis 104. Also, the cover plate 216 may define the first axial end 208 of the coolant core 202. The reservoir body 214 may be a generally thin-walled and hollow body with an open side 209 that is covered over by the cover plate 216 and a second side 211 that defines the second axial end 210 of the coolant core 202. The cover plate 216 may be fixed to the reservoir body 214 and sealed thereto with a gasket, seal, etc. One or more fasteners (e.g., bolts or other fasteners may extend axially through the cover plate 216 and the reservoir body 214 for attaching the same. The cover plate 216 and the reservoir body 214 may include one or more fastener holes 270 that receive a bolt or other fastener for attaching the first side electronics to the coolant core 202. Accordingly, the cover plate 216 and the reservoir body 214 may cooperate to define a fluid passage 220 that extends through the coolant core 202. In some embodiments, the fluid passage 220 may be elongate and may extend generally about the axis 104 from the first angular end 231 to the second angular end 232.

The coolant core 202 may also include at least one fluid inlet 222 to the fluid passage 220 and at least one fluid outlet 224 from the fluid passage 220. In some embodiments, for example, there may be a single, solitary inlet 222. The inlet 222 may be disposed proximate the first angular end 231 and may include a round, cylindrical, and hollow connector 223 that projects along the axis 104 from the cover plate 216 away from the first axial end 208. Also, in some embodiments, there may be a single, solitary outlet 224. The outlet 224 may be disposed proximate the second angular end 232 and may include a round, cylindrical, and hollow connector 226 that projects along the axis 104 from the cover plate 216 away from the first axial end 208.

The coolant core 202 may be fluidly connected to a coolant circuit 225, which is illustrated schematically in FIG. 1. The coolant circuit 225 may circulate any suitable fluid, such as a liquid coolant, between the fluid passage 220 and a heat exchanger 203 (FIG. 1). More specifically, coolant may flow from the inlet 222, through the fluid passage 220, to the outlet 224, thereby removing heat from the integrated controller 150, and may continue to flow through the heat exchanger 203 to be cooled before flowing back to the inlet 222 of the coolant core 202, and so on. Furthermore, as shown in FIG. 1, the heat exchanger 203 may, in some embodiments, be separate and fluidly independent of an engine coolant system 207 that cools the engine 125.

As shown in FIG. 4, the second axial end 210 of the coolant core 202 may include one or more inner apertures 240. The inner apertures 240 may include a plurality of pockets, recesses, receptacles, etc. that are open at the second side 211 of the reservoir body 214 and that are disposed proximate the inner radial area 204 of the core 202 in the radial direction. As shown, the inner apertures 240 may be generally cylindrical in some embodiments with circular profiles and with the longitudinal axis thereof arranged parallel to the axis 104. There may be a plurality of inner apertures 240 arranged at different angular positions with respect to the axis 104 along the inner radial area 204 of the core 202. The size and shape of the inner apertures 240 may correspond to certain ones of the internal components 154 of the integrated controller 150. For example, the inner apertures 240 may be cylindrical, as shown, to receive and support inner electronics components, such as a series of capacitors 241 (FIG. 2) of the controller 150. Furthermore, as shown in FIGS. 3 and 4, the reservoir body 214 may define the apertures 240 with relatively thin walls 245 or other structures that separate the capacitors 241 within the apertures 240 from the coolant within the fluid passage 220. Accordingly, the capacitors 241 may be effectively cooled by the coolant circuit 225.

Likewise, as shown in FIG. 4, the second side 211 of the reservoir body 214 may include a second side aperture 246 that has an ovate profile and that is recessed in the axial direction into the reservoir body 214. The second side aperture 246 may be arranged with the major axis of its ovate shape extending tangentially with respect to the axis 104. Also, the minor axis may extend radially and may be large enough to extend over both the inner radial area 204 and the outer radial area 206 of the coolant core 202. Furthermore, the second side aperture 246 may be shaped correspondingly to another electronics component, such as an inverter, capacitor, a battery, or another piece of control equipment.

Additionally, the outer radial area 206 of the coolant core 202 may extend about the axis 104 and may include one or more seats 219. The seats 219 may be rectangular and may lie in a respective tangential plane with respect to the axis 104. The seats 219 may be disposed and spaced apart at different angular positions with respect to the axis 104. Furthermore, seats 219 may include a respective outer aperture 250 extending radially therethrough. In some embodiments, at least one outer aperture 250 may be a rectangular hole that is centered within the respective seat 219 and that passes through the reservoir body 214 to the fluid passage 220 therein. These outer apertures 250 may be sized and configured to receive an outer electronics component 251 (FIG. 2), such as a substantially-flat and rectangular transistor, circuit component, switch component, MOSFET transistor, etc. The electronics component 251 may be partially received in a respective outer aperture 250 and may be supported and mounted on a respective seat 219 so as to cover over the respective outer aperture 250. There may be a gasket or other sealing member that seals the electronics component 251 to the seat 219. Also, the electronics component 251 may include one or more thermally-conductive projections 254 (FIG. 2), such as an array of fins, rails, posts, pins, etc.) that project from an underside thereof to extend into the fluid passage 220. Accordingly, coolant within the coolant circuit 225 may flow across the projections 254 to provide highly effective cooling to the electronics component 251.

Additionally, the first axial end 208 defined substantially by the cover plate 216 may provide one or more surfaces for mounting and supporting a first side electronics package 260. The first side electronics package 260 is represented schematically in FIG. 2 as a semi-circular body that corresponds generally to the shape of the coolant core 202, and it will be appreciated that the first side electronics package 260 may comprise a plurality of electronics components, such as one or more conductive bus bars, circuit board assemblies, etc. There may also be support structures, such as brackets, plates, etc. for supporting the electronics package 260. Furthermore, there may be a number of fasteners for attaching the first side electronics package 260 to the first axial end 208 of the coolant core 202. The first side electronics package 260 may be layered on the first axial end 208 such that both extend arcuately about the axis 104. The first side electronics package 260 may be attached to the first axial end 208 in any suitable fashion, such as fasteners. Accordingly, the first side electronics package 260 may be in close proximity with at least one surface of the package 260 layered on and abutting an opposing surface of the coolant core 202 such that the coolant core 202 may absorb heat therefrom with high efficiency and effectiveness.

Likewise, the second axial end 210 of the coolant core 202 may provide one or more surfaces for mounting and supporting a second side electronics package 262. Like the first side electronics package 262, the second side electronics package 262 is represented schematically, however, it will be appreciated that the package 262 may include a number of electronic and/or mechanically supportive/fastening parts. The second side electronics package 262 may be arcuate and may extend partly about the axis 104. The second side electronics package 262 may be layered on the second axial end 210 such that both extend arcuately about the axis 104. The second side electronics package 262 may be attached to the second axial end 210 in any suitable fashion, such as fasteners. Moreover, the second side electronics package 262 may be in close proximity to the coolant core 202 with at least one surface of the package 262 layered on and abutting an opposing surface of the coolant core 202 for efficient and effective cooling.

The fluid passage 220 for the coolant within the coolant core 202 may be defined between the inner surfaces of the reservoir body 214, the inner face of the cover plate 216, and the inner faces of the outer electronics components 251. The fluid passage 220 may also extend arcuately about the axis 104, from the inlet 222 to the outlet 224. Coolant may enter via the inlet 222, flow generally from the first angular end 231 to the second angular end 232 and exit via the outlet 224. Accordingly, the coolant may flow in close proximity and across the core-facing surfaces of the outer electronics components 251, the capacitors 241, the first side electronics package 260, and the second side electronics package 262.

Accordingly, in some embodiments, the coolant core 202 may be substantially surrounded by heat-producing electronics components. The coolant core 202 may be thermally coupled to these components due to the close proximity and, in some areas, due to abutting contact therebetween. Some interfaces (e.g., at the projections 254) may provide direct fluid contact with the coolant. As shown in FIG. 2, the coolant core 202 may be thermally coupled to the electronics components on the inner radial area 204, the outer radial area 206, the first axial end 208 and the second axial end 210. The fluid passage 220 may be defined radially between the inner radial area 204 and the outer radial area 206 to receive heat from both the inner electronics components (e.g., the capacitors 241) and the outer electronics components 251. Moreover, the fluid passage 220 may be defined axially between the first and second axial ends 208, 210 to receive heat from both the first and second side electronics packages 260, 262.

Furthermore, the controller 150 may be integrated and packaged among the turbine section, the motor 116, and/or the compressor section, any of which may operate at elevated temperatures. The coolant core 202 and the coolant circuit 225 may provide cooling to these surrounding components as well. Thus, it will be appreciated that the controller 150 may be packaged compactly and that there may be several features that generate heat during operation; however, the coolant core 202, the coolant circuit 225, and other features discussed above may provide effective and efficient cooling.

Moreover, the controller 150 may be robustly supported on the turbocharger 100. The coolant core 202 may provide mechanical support while also providing compact packaging for the controller 150. Also, the part count may be relatively low and the controller 150 may be manufactured and assembled in an efficient manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A fluid compressor device comprising:
   a housing;
   a rotating group supported for rotation within the housing about an axis;
   a compressor stage including a compressor wheel of the rotating group that is supported on a shaft of the rotating group;
   an e-machine stage including an e-machine that is operably coupled to the shaft and that is configured to operate as at least one of a motor and a generator; and
   an integrated controller that extends at least partly over the e-machine stage in a circumferential direction about the axis, the integrated controller including a coolant core that receives a flow of a coolant therethrough for cooling the integrated controller, the coolant core extending at least partly over the e-machine stage in a circumferential direction about the axis, the coolant core including an aperture configured to receive an electronics component of the integrated controller, the coolant core configured to receive heat therefrom.

2. The fluid compressor device of claim 1, wherein the coolant core is arcuate and includes an inner radial area and an outer radial area that are spaced apart radially with respect to the axis;
   wherein the aperture is an inner aperture proximate the inner radial area, and wherein the electronics component is an inner electronics component that is received in the inner aperture;
   wherein the coolant core includes an outer aperture proximate the outer radial area;
   further comprising an outer electronics component that is received in the outer aperture, the coolant core configured to receive heat from the outer electronics component; and
   wherein the coolant core includes a fluid passage that the flow of the coolant flows through, and wherein the fluid passage is defined radially between the inner radial area and the outer radial area with respect to the axis such that the flow of coolant is configured to receive heat from both the inner electronics component and the outer electronics component.

3. The fluid compressor device of claim 1, wherein the aperture is a hole that extends through an outer wall of the coolant core, wherein the electronics component is received at least partly within the hole to close off the hole; and
   wherein the electronics component includes a thermally-conductive projection that is disposed within a fluid passage of the coolant core that is configured to receive the flow of coolant.

4. The fluid compressor device of claim 1, wherein the coolant core is arcuate and includes an axial end; and further comprising an end electronics package that is supported and disposed at the axial end, the coolant core thermally coupled to the electronics package and configured to receive heat therefrom.

5. The fluid compressor device of claim 4, wherein the axial end is a first axial end and the end electronics package is a first end electronics package;

wherein the coolant core includes a second axial end; and further comprising a second end electronics package that is supported and disposed at the second axial end, the coolant core thermally coupled to the second end electronics package and configured to receive heat therefrom.

6. The fluid compressor device of claim 1, wherein the coolant core is arcuate and includes an axial end that includes the aperture.

7. The fluid compressor device of claim 1, wherein the coolant core includes an outer radial area that faces away radially from the axis; and wherein the outer radial area includes the aperture.

8. The fluid compressor device of claim 7, wherein the aperture is a first outer aperture configured to receive a first electronics component of the integrated controller;

further comprising a second outer aperture on the outer radial area configured to receive a second electronics component of the integrated controller to receive heat therefrom; and wherein the first and second outer apertures are spaced apart angularly about the axis.

9. The fluid compressor device of claim 7, wherein the outer radial area includes at least one seat that lies substantially within a tangential plane with respect to the axis, the at least one seat configured for supporting the electronics component.

10. The fluid compressor device of claim 1, wherein the coolant core includes a reservoir body with an open end and a cover member that is fixed to the reservoir body to cover over the open end, wherein the reservoir body and the cover member cooperatively define a fluid passage within the coolant core, the fluid passage configured to receive the flow of coolant.

11. The fluid compressor device of claim 1, wherein the coolant core includes an inlet to the fluid passage and an outlet from the fluid passage, the inlet and the outlet spaced apart circumferentially with respect to the axis.

12. The fluid compressor device of claim 1, wherein the coolant core extends at least forty-five degrees (45°) about the axis.

13. The fluid compressor device of claim 12, wherein the coolant core extends approximately one-hundred-eighty degrees (180°) about the axis.

14. A method of manufacturing a fluid compressor device comprising:

supporting a rotating group for rotation within a housing about an axis, the rotating group including a compressor wheel that is supported on a shaft;

operably coupling an e-machine of an e-machine stage to the shaft, the e-machine configured to operate as at least one of a motor and a generator; and connecting an integrated controller to the e-machine, the integrated controller extending at least partly over the e-machine stage in a circumferential direction about the axis, the integrated controller including a coolant core configured to receive a flow of a coolant therethrough for cooling the integrated controller, the coolant core extending at least partly over the e-machine in a circumferential direction about the axis, the coolant core including an aperture configured to receive an electronics component of the integrated controller, the coolant core configured to receive heat therefrom.

15. A turbocharger comprising:

a housing;

a rotating group supported for rotation within the housing about an axis;

a compressor stage including a compressor wheel of the rotating group that is supported on a shaft of the rotating group;

a turbine stage including a turbine wheel of the rotating group that is supported on the shaft of the rotating group;

a motor stage including an electric motor that is operably coupled to the shaft and that is configured to drivingly rotate the rotating group about the axis; and an integrated controller that extends at least partly over the motor stage in a circumferential direction about the axis, the integrated controller including a coolant core that receives a flow of a coolant therethrough for cooling the integrated controller, the coolant core extending at least partly over the motor stage in a circumferential direction about the axis.

16. The turbocharger of claim 15, wherein the coolant core is arcuate and includes an inner radial area, an outer radial area, a first axial end, and a second axial end; and further comprising a plurality of electronics components, a first of which is supported at the inner radial area, a second of which is supported at the outer radial area, a third of which is supported at the first axial end, and a fourth of which is supported at the second axial end, the coolant core configured to cool the first, second, third, and fourth of the plurality of electronics components.

17. The turbocharger of claim 15, wherein the coolant core includes a reservoir body with an open end and a cover member that is fixed to the reservoir body to cover over the open end, wherein the reservoir body and the cover member cooperatively define a fluid passage within the coolant core.

18. The turbocharger of claim 15, wherein the coolant core includes an inlet to the fluid passage and an outlet from the fluid passage, the inlet and the outlet spaced apart circumferentially with respect to the axis.

19. The turbocharger of claim 15, wherein the motor stage is disposed axially between the compressor stage and the turbine stage with respect to the axis.

* * * * *